H. BICKFORD.
Lathes.

No. 153,304.

Patented July 21, 1874.

Attest

Inventor
Henry Bickford
By F. Millward
Attorney

UNITED STATES PATENT OFFICE.

HENRY BICKFORD, OF CINCINNATI, OHIO, ASSIGNOR TO THE FOLDING HAT-RACK COMPANY, OF SAME PLACE.

IMPROVEMENT IN LATHES.

Specification forming part of Letters Patent No. 153,304, dated July 21, 1874; application filed September 30, 1873.

*To all whom it may concern:*

Be it known that I, HENRY BICKFORD, of Cincinnati, Hamilton county, State of Ohio, have invented a certain new and useful Improvement in Automatic Lathes, of which the following is a specification:

My invention relates to machines for turning up irregular forms automatically, and consists of a combination of devices by which the blank of wood to be operated upon is seized automatically by the machine, made to rotate upon centers, and carried in contact with a rotary cutter fitted with knives which are so disposed and formed as to cut the blank to the configuration desired, the knives being located on the cutter-head so as to follow and thus relieve each other, and cut with the grain.

Figure 1:
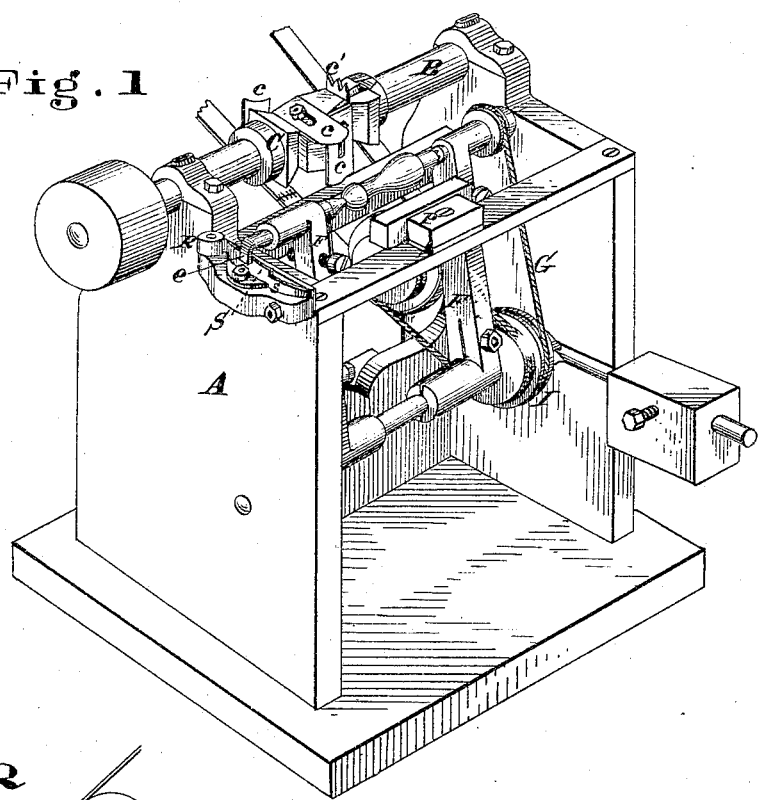
Figure 2:
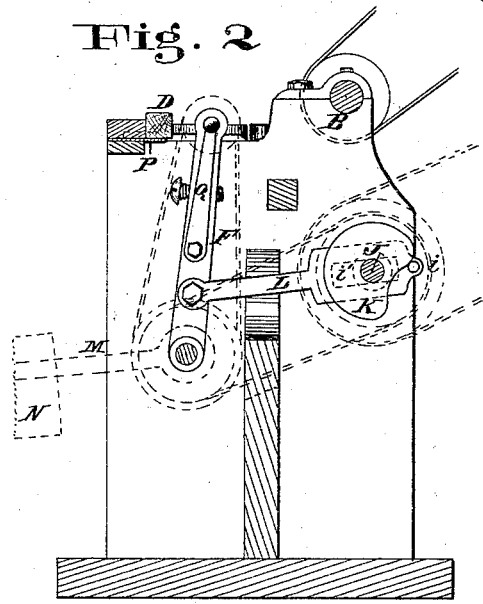

Figure 1 is a perspective view of a machine embodying my invention. Fig. 2 is a cross-section of the same; and Fig. 3, a plan.

Figure 3:
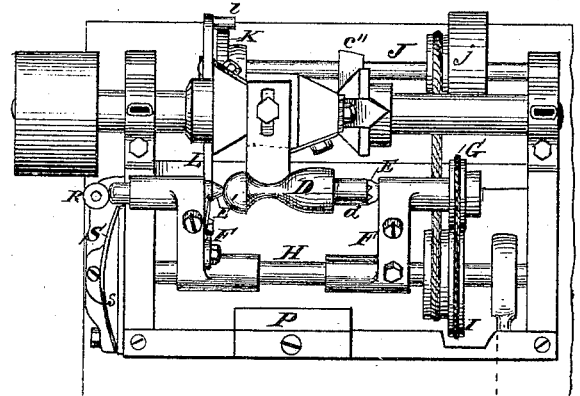

A is the frame of the machine, and B a spindle adapted to rotate rapidly, and fitted with a cutter-head, C, having a series of cutters or knives, $c$, projecting from it, so formed at the ends, as shown, and so set in the head, inclined or otherwise, that in the operation of the head each cutter shall be confined to work requiring a cut into the blank inward, or, in other words, form a large diameter to a small diameter, so as to cut with the grain. A spur, $c'$, is attached to the cutter-head when it is necessary to cut a tenon with a square shoulder, the spur serving to cut the shoulder, and the knife $c''$ accompanying it to clear away the wood to form the tenon $d$ on the blank D. The cutter-head shown, with its knives, is adapted, for illustration, to cut the blank D into the form of a hat-rack pin, as shown in Figs. 1 and 3, but it is obvious that the knives may be so located and formed as to cut handles, chair-rounds, &c., preserving at the same time the system of cutters which provides for the cutting of the wood with the grain, and for the clearance of each cutter. The blank is secured between the centers E E' of a swinging lathe, F, the revolving center E of which is barbed in the usual way in wood-lathes. The other center, E', is simply a conical stationary point, upon which the wood turns. The center E is rotated by belt G from the shaft H, upon which the lathe swings, the pulley I which drives the belt being itself driven by belt-connection with shaft J, which carries a pulley having driving-pulley $j$ upon it to connect with suitable motive power. The shaft J carries a cam K, which operates to swing the lathe to and from the cutter-head by means of pitman L, which has a projection, $i$, upon it for the cam to operate upon, the pitman having a slot, $i'$, so as to permit it to embrace and slide upon the shaft J. The pitman is preserved in contact with the cam by means of the lever M and weight N.

In the movement of the lathe backward and forward, the blank is centered properly and automatically, and in the forward stroke is carried forward to the cutter-head. Upon the return stroke of the lathe the finished article is dropped from the machine, the centering and dropping devices being as follows: A stationary rest or gaging table, P, is secured to the frame of the machine, upon which the blank D rests, the gage or rest being so located that the centers of the lathe, upon the termination of the stroke backward, will strike the center of the blank. The center E, at the backward termination of the stroke of the lathe, is forced into the blank by the spring Q, and, when approaching the forward termination of the stroke, it is forced deeply into the blank by rolling contact with roller R, supported upon the frame of the machine. A spring-guide, S, engages with the projecting end $e$ of the center E', upon the return stroke of the lathe, in such a way as to withdraw the center from the wood and allow the finished article to drop into a suitable receptacle, the progress of the projection $e$ over the guide, on the return stroke, being opposed to the action of the spring Q. When the lathe has passed backward so as to bring the centers E E' in the axial line of the blank, a gap, $s$, in the spring-guide S, allows the spring Q to project the center E' into the new blank. Upon the progress of the lathe forward the projection $e$ is inside the guide, and acts to force the guide outward, so that when the projection has passed the spring-guide the latter may retract so as to cause the projection to pass outside of it on the return, in the manner shown in Fig. 1. In the operation of the machine it is simply necessary for a boy to rapidly place the blanks in succession upon the rest or gage P, as the machine automatically accomplishes all the rest of the work, and, owing to the construction of the cutter-head, cuts the work so as to leave a smooth true surface, which, in some cases, will not even require sandpapering.

What I claim is—

1. The combination of the revolving cutter-head C, automatically-vibrating lathe F E E', and stationary blank rest or gage P, substantially as specified.

2. In combination with the cutter-head C, rest B, and centers E E', of vibrating lathe F, the spring Q, projection e, and spring-guide S s, operating substantially in the manner and for the purpose specified.

3. The combination of the centers E E' of the vibrating lathe, spring Q, projection e, spring-guide S s, and roller R, substantially as and for the purposes specified.

In testimony of which invention I hereunto set my hand.

H. BICKFORD.

Witnesses:
FRANK MILLWARD,
J. L. WARTMANN.